(12) United States Patent
Zwier

(10) Patent No.: US 6,938,369 B2
(45) Date of Patent: Sep. 6, 2005

(54) CHANGE OF GRADE CONNECTOR

(75) Inventor: Daniel G. Zwier, Holland, MI (US)

(73) Assignee: Permaloc Corporation, Holland, MI (US)

( * ) Notice: Subject to any disclaimer, the term of this patent is extended or adjusted under 35 U.S.C. 154(b) by 0 days.

(21) Appl. No.: 10/627,283

(22) Filed: Jul. 25, 2003

(65) Prior Publication Data
US 2004/0020113 A1 Feb. 5, 2004

Related U.S. Application Data

(60) Provisional application No. 60/400,212, filed on Jul. 31, 2002.

(51) Int. Cl.[7] ................................................. A01G 1/08
(52) U.S. Cl. ........................................... 47/33; 52/102
(58) Field of Search ................................ 47/33; 52/102

(56) References Cited

U.S. PATENT DOCUMENTS

| 3,314,193 | A | * | 4/1967 | Chancellor | 47/33 |
| 3,343,301 | A | * | 9/1967 | Adelman | 47/33 |
| 3,537,687 | A | * | 11/1970 | Adelman | 256/19 |
| 4,628,632 | A | | 12/1986 | Zwier | |
| 5,901,526 | A | * | 5/1999 | Vidmar et al. | 52/745.09 |
| 5,921,021 | A | * | 7/1999 | Coates | 47/33 |
| 6,202,367 | B1 | * | 3/2001 | Marino et al. | 52/102 |
| 6,327,815 | B1 | * | 12/2001 | Becton et al. | 47/33 |
| 2002/0189162 | A1 | * | 12/2002 | Richet et al. | 47/33 |

* cited by examiner

Primary Examiner—Teri Pham Luu
Assistant Examiner—Susan C. Alimenti
(74) Attorney, Agent, or Firm—Flynn, Thiel, Boutell & Tanis, PC

(57) ABSTRACT

A change of grade connector which includes first and second connector members. Each of the connector members is configured to attach to an end of a conventional landscaping edging strip. A longitudinal centerline extends through each of the connector members. The connector includes a fastener which is configured to pivotally attach the connector members. The connector members can pivot with respect to one another along the fastener axis between a first position in which the longitudinal centerlines are aligned and a second position in which the longitudinal centerlines are out of alignment.

20 Claims, 5 Drawing Sheets

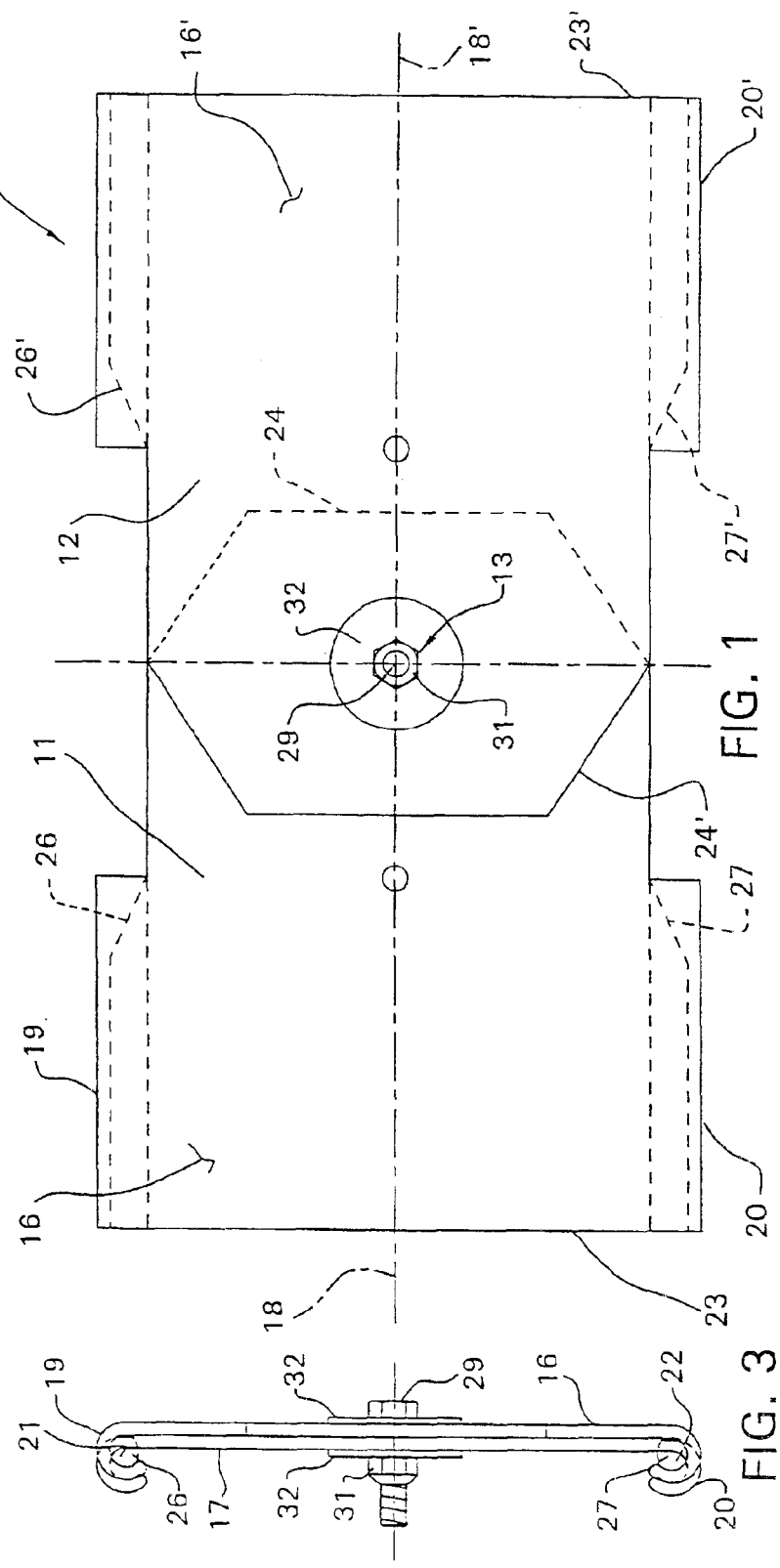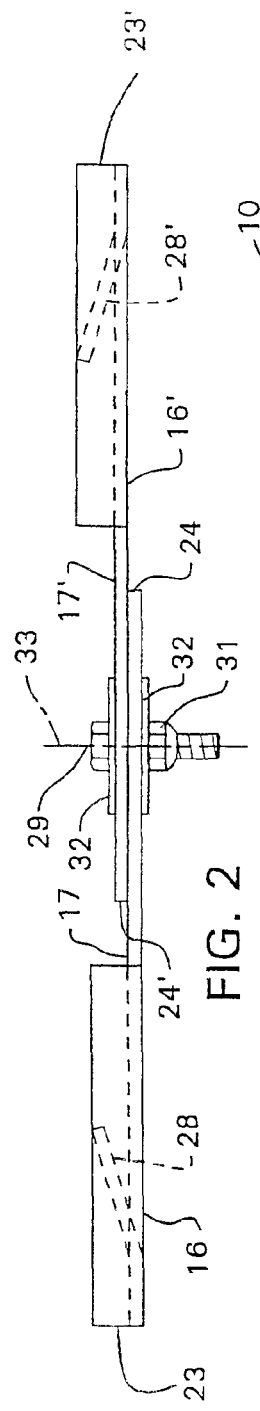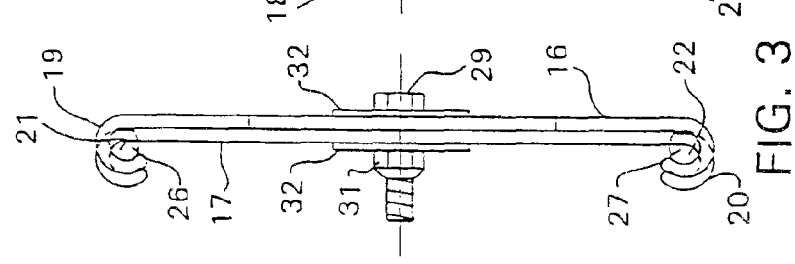

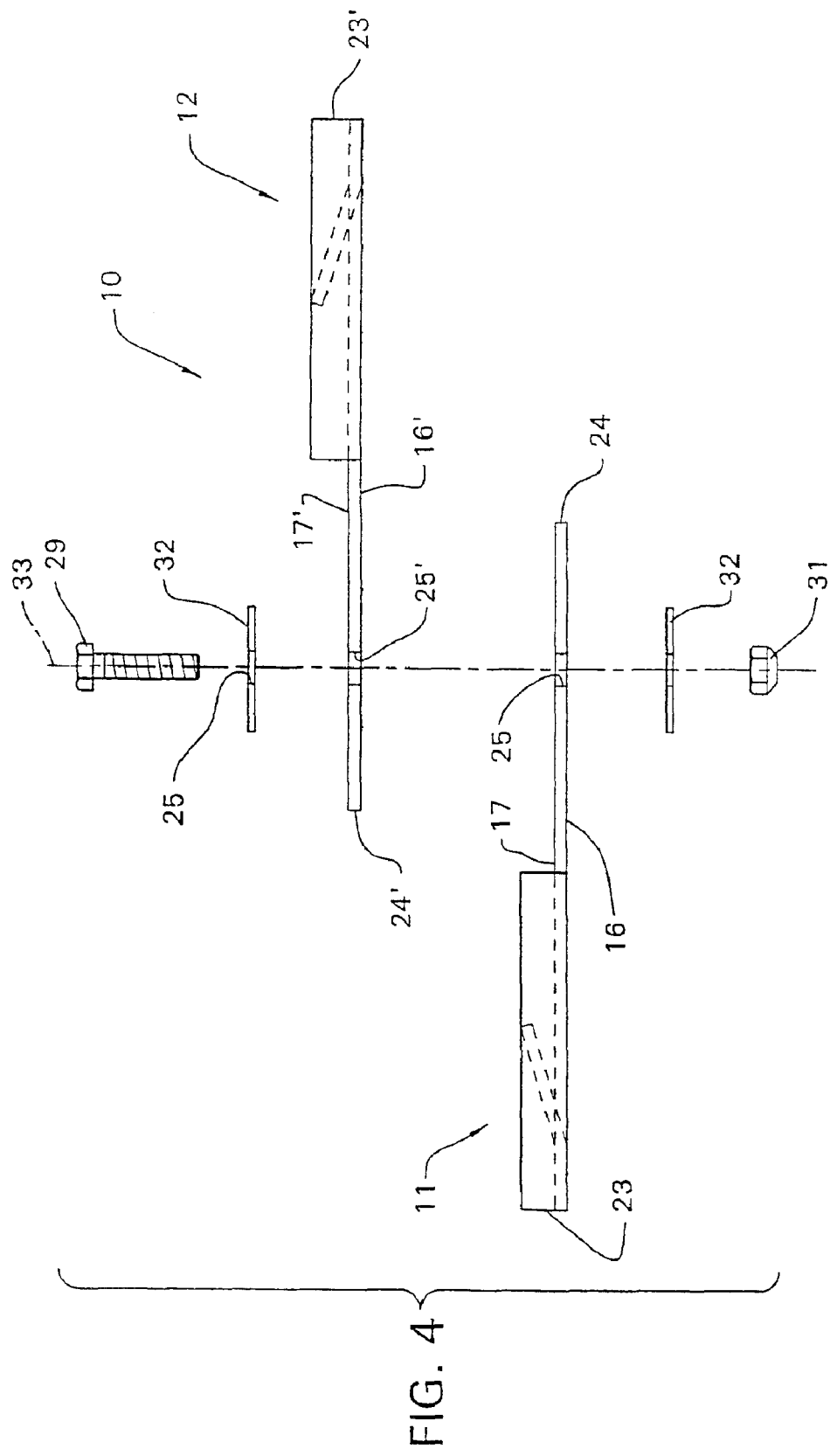

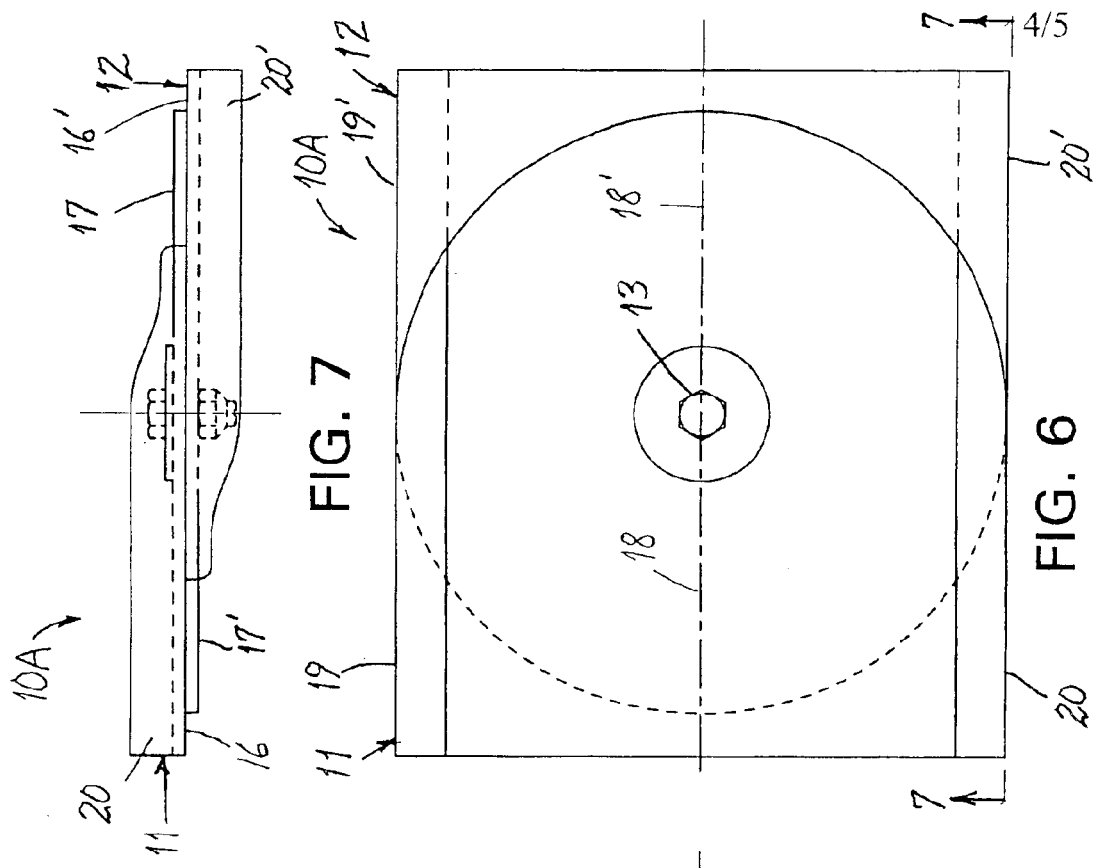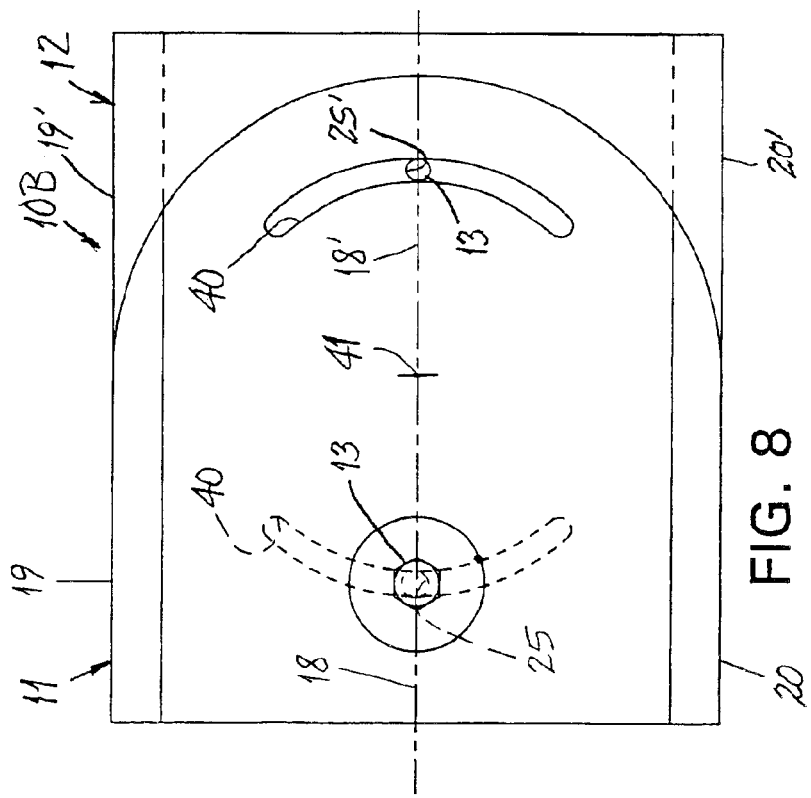

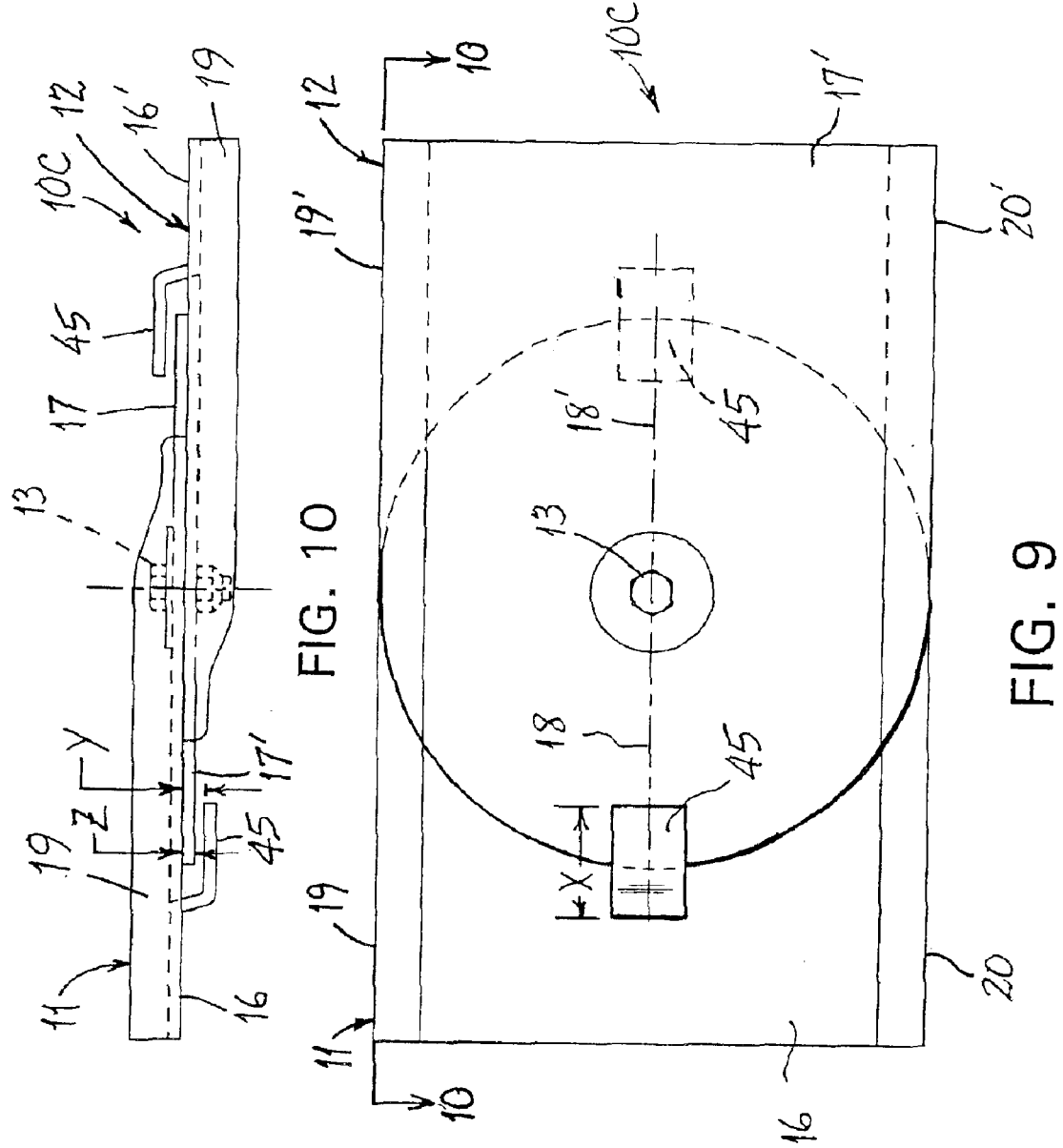

_US 6,938,369 B2_

CHANGE OF GRADE CONNECTOR

CROSS REFERENCE TO RELATED APPLICATION

This application claims the benefit of U.S. Provisional Application No. 60/400,212, filed Jul. 31, 2002.

FIELD OF THE INVENTION

This invention relates generally to landscaping equipment and, more particularly, to a change of grade connector which can be used in conjunction with landscaping edging strips to surround a desired area which extends over at least one region with a change in grade.

BACKGROUND OF THE INVENTION

Edging strips, such as those comprised of extruded aluminum or other suitable materials, have found particular usefulness in landscaping applications. One example of such an edging strip is disclosed in U.S. Pat. No. 4,628,632, which issued on Dec. 16, 1986 and is entitled "Edging Strip". While the disclosed edging strips have been used with success to surround flower beds, pathways and other desired areas, there is room for improvement. For instance, when there is a change in grade in the area which is desired to be surrounded, problems with the utility of these prior art edging strips are encountered.

Landscapers currently use one of two approaches when installing conventional edging strips over an area having a change of grade. While both approaches have had limited success, each has a drawback. The first approach is to twist the edging strip along its longitudinal length. However, the edging strip will resist the unnatural deflection of this solution. When this resistance is coupled with a change in elemental conditions, such as changes from freeze to thaw and warm to cold, the edging strip can lift upward against the twist. In addition to giving the area a displeasing aesthetic appearance, this lifting will subject the edging strip to inevitable damage from landscape maintenance equipment.

A second solution used by landscapers to adapt straight edging strips to land having a change of grade includes cutting "V" shaped notches into the edging strip. These notches can be cut into either the top or the bottom of the edging strip, to allow the strip to be bent to conform to the grade change of the land. However, this solution is also hampered by a number of drawbacks. For instance, cutting notches into the extruded aluminum edging strips can be very time consuming, causing landscapers to waste valuable time preparing the edging strips for use. Further, when a notch is cut into an edging strip, a significant loss of strength results in that section of the edging strip. When combined with forces of nature such as transitions between freeze and thaw and/or heat and cold, failure of the edging section can result. Once an edging section fails it can lift significantly out of the ground causing a negative aesthetic appearance and a potential tripping hazard if the edging strip is being used in an area open to pedestrian traffic.

In light of the drawbacks of the above described solutions, it should be appreciated that a need exists for an edging device which will allow areas having one or more adjacent changes in grade to be satisfactorily surrounded by conventional edging strips. The present invention is directed to this need.

SUMMARY OF THE INVENTION

This invention is directed to a new and useful change of grade connector including first and second connector members. Each of the connector members is configured to attach to an end of a conventional landscaping edging strip or a series of interconnected connectors. A longitudinal centerline extends through each of the connector members. The connector includes a fastener which is configured to pivotally attach the connector members. The connector members can pivot with respect to one another along the fastener axis between a first position in which the longitudinal centerlines are aligned and a second position in which the longitudinal centerlines are out of alignment.

BRIEF DESCRIPTION OF THE DRAWINGS

This invention is pointed out with particularity in the accompanying claims. The above and further features and benefits of this invention are better understood by reference to the following detailed description, as well as by reference to the following drawings in which:

FIG. 1 is a front view of the change of grade connector of the present invention;

FIG. 2 is a side view of the FIG. 1 change of grade connector;

FIG. 3 is an end view of the FIG. 1 change of grade connector;

FIG. 4 is an assembly view of the FIG. 1 change of grade connector;

FIG. 6 is a plan view of an alternate assembly of a change of grade connector embodying the invention;

FIG. 7 is a view taken along the line 7—7 of FIG. 6;

FIG. 8 is a plan view of a further alternate assembly embodying the invention and utilizing two fasteners;

FIG. 9 is a plan view of a further alternate assembly of a change of grade connector embodying the invention; and FIG. 10 is a view taken along the line 10—10 of FIG. 9.

DETAILED DESCRIPTION

Figure 5:
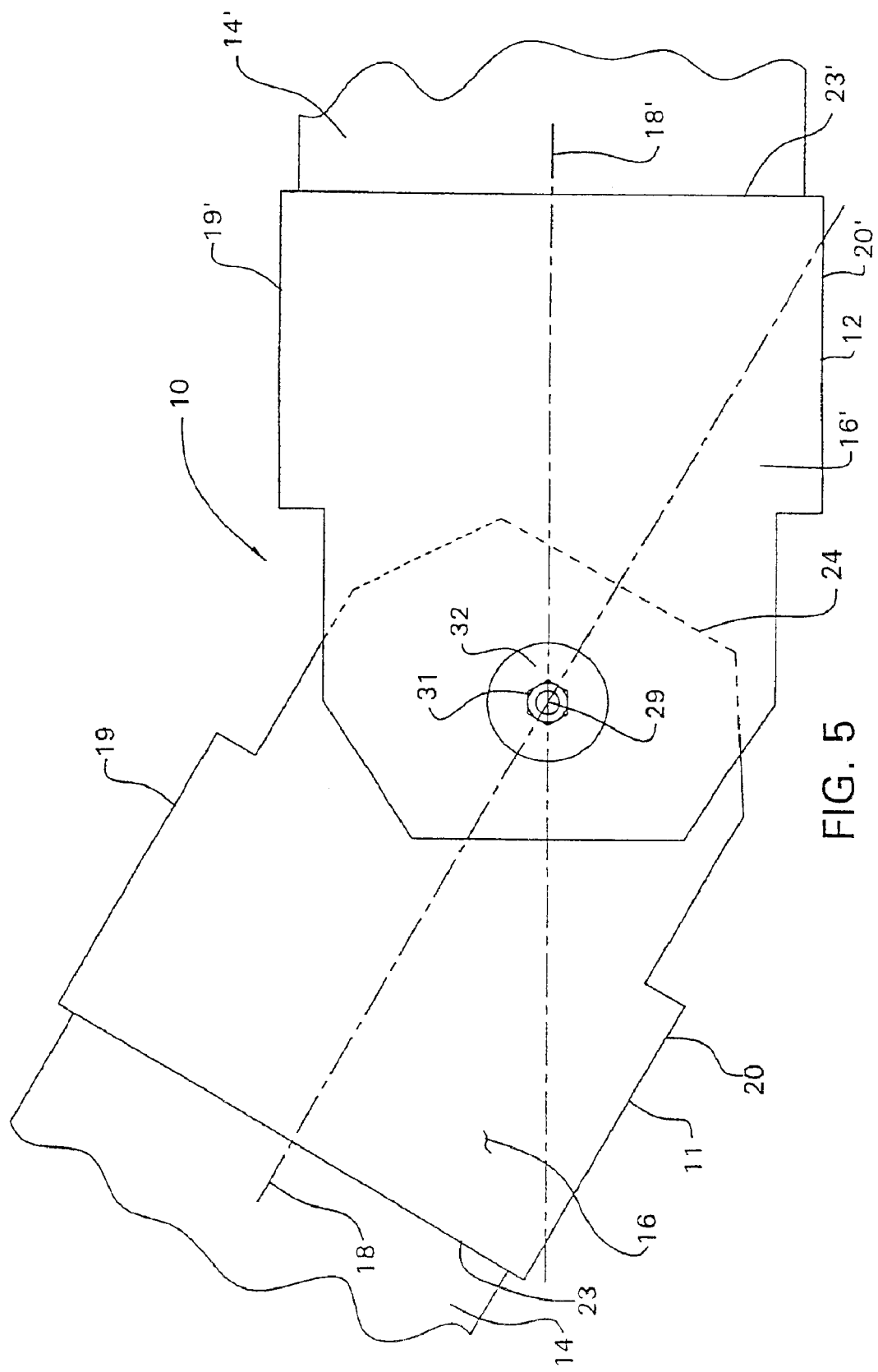
FIG. 5 is a top view of the FIG. 1 change of grade connector in a fully pivoted position.

Referring to FIGS. 1–3 there is illustrated a change of grade connector 10 according to the present invention. The change of grade connector 10 can be manufactured from aluminum, steel, plastic or any other suitable material. The change of grade connector 10 includes first and second extruded connector members 11 and 12 which are secured together by a fastener 13.

When the change of grade connector 10 is configured as illustrated herein, the first and second connector members 11 and 12 are identical. While the identical configuration is preferable, it should be appreciated that this is not a requirement. However, both connector members 11 and 12 should be configured to attach to an end of a conventional edging strip 14, 14' (FIG. 5) sequentially connected when the change of grade connector 10 is assembled.

The connector member 11 has a front side 16 and a rear side 17. A longitudinal axis 18 extends along the connector member 11. The connector member 11 is preferably symmetrical about the longitudinal axis 18. The connector member 11 has a top edge 19 and a bottom edge 20 which extend substantially parallel to the longitudinal axis 18. The top edge 19 of the connector member 11 is bent back around toward the rear side 17 to form a top channel 21. The bottom edge 20 is similarly bent toward the connector member rear side 17 to form a bottom channel 22.

The connector member 11 has a first side edge 23 which extends between the top and bottom edges 19 and 20 and is substantially perpendicular to the longitudinal axis 18. A second side edge 24 is spaced apart from the first side edge 23. The second side edge 24 is contoured by a separate, factory performed machining or trimming process so that the center of the connector member 11 is longer than either of the top and bottom edges 19 and 20. A bore 25 (FIG. 4) extends through the center of the connector member 11 near the second side edge 24.

The end of the top edge 19 adjacent the second side edge 24 of the connector member 11 is crimped or pinched toward the rear side 17 to form a stop lance 26 in the top channel 21 (FIG. 3). An identical stop lance 27 is formed in the bottom channel 22. Each stop lance 26 and 27 is sized and positioned to form a stop which limits the distance the edging strip 14 can be slid along the connector member 11. A locking lance 28 (shown only in FIG. 2) can be formed or punched in the first connector member 11. The locking lance 28 is configured to allow the edging strip 14 to be slid freely toward the second side edge 24. However, when a force is exerted on the edging strip 14 which pulls the edging strip 14 toward the first side edge 23, the locking lance 28 creates a friction force which slows movement of the edging strip 14 in that direction. The friction force created by the locking lance 28 is sufficient only to slow or stop unintended movement of the edging strip 14 and should not prevent the edging strip 14 from being intentionally pulled out of the connector 10, such as for resizing or repositioning of the edging strip 14 and/or the connector 10.

As indicated above, the second connector member 12 is identical to the first connector member 11. Thus, a detailed description of the components of the second connector member 12 will not be provided. Each feature of the second connector member 12 is identified in FIGS. 1–5 with the same feature number of the like component of the first connector member 11 and a prime ('). For instance, the front side of the first connector member 11 is designated as feature 16 whereas the front side of the second connector member 12 is designated as feature 16'.

To assemble the change of grade connector 10, the first and second connector members 11 and 12 are positioned with their respective second side edges 24 and 24' adjacent one another (FIG. 4). The front side 16' of the second connector member second side edge 24' is placed against the rear side 17 of the first connector member second side edge 24 so that the bores 25 and 25' are aligned. When the fastener 13 is configured as illustrated, a bolt 29 is included and is inserted through the bores 25 and 25'. A nut 31 is tightened around the bolt 29 to secure the first and second connector members 11 and 12 together. The illustrated fastener 13 can also include one or more washers 32. The nut 31 is tightened a sufficient amount to adequately secure the connector members 11 and 12 together, while still allowing the connector members 11 and 12 to pivot with respect to each other about an axis 33 (FIG. 2) of the bolt 29. While the fastener 13 has been illustrated herein as a nut and bolt assembly, it should be appreciated that any suitable fastener would suffice. For instance, the fastener 13 could instead be a rivet or snap fastener, a bayonet fastener or any other suitable fastening means which secures the connector members 11 and 12 together while allowing these components to pivot with respect to one another.

When the connector members 11 and 12 are configured as illustrated, the change of grade connector 10 can pivot between a first position in which the longitudinal axes 18 and 18' are aligned and a second position in which the longitudinal axes 18 and 18' are inclined relative to one another to infinitely variable positions, as illustrated in FIG. 5. Preferably, the connector members 11 and 12 can pivot so that the angle of inclination is at least 90°.

OPERATION

The change of grade connector 10 can be used to aid in the positioning of a landscaping edging strip in any area having a change of grade. The change of grade connector 10 is first adjusted to the desired angle. An edging strip 14 is then slid along the rear side 17 of the first connector member 11 so that the top and bottom edges of the edging strip 14 are secured within the top and bottom channels 21 and 22 of the connector member 11. The edging strip 14 is slid along the connector member 11 until it contacts the stop lances 26 and 27, which prevent further advancement. A second edging strip 14' is secured in the second connector member 12 in a similar manner. The edging strip-change of grade connector assembly can now be placed in the desired location. If needed, the angle of the change of grade connector 10 can be adjusted by further pivoting the connector members 11 and 12 with respect to one another. Due to the location of the stop lances 26, 26', 27 and 27', the two edging strips 14 and 14' will not come into contact when the change of grade connector 10 is adjusted.

ALTERNATE ASSEMBLIES

While the shape of the identical pieces 16 and 16' is altered in FIGS. 6–8, the overall concept of the change of grade connector 10A in FIGS. 6–8 remains unchanged and, as a result, the reference numbers used above will be used in the following description of FIGS. 6–8 to designate common features. Therefore, it is to be considered to be within the scope of the invention to orient the two identical pieces 11 and 12 so that the front side 16' of one member 12 is placed against the front side 16 of the other member 11 to form the change of grade connector 10A. The fastener 13 and receiving holes therefor are oriented in generally the geometric center of each member 11 and 12. Such a configuration (shown in FIGS. 6 and 7) will permit a shortened overall length of the assembled members 11 and 12. Since the curled top and bottom edges 19 and 20 (19' and 20') will be oriented on the respective rear sides 17, 17' which now face away from each other in opposite directions, they will not interfere with one another (top to top or bottom to bottom) to limit the degree of relative pivotal movement therebetween.

As illustrated in FIG. 8, a further alternate assembly of a change of grade connector 10B is provided wherein a pair of fasteners 13 can be utilized in instances where there is provided a fastener receiving hole 25, 25' in one connector member and an adjacent arcuate slot 40, 40' in the other connector member, the radius of the two arcuate slots having a common axis 41 located midway therebetween.

In instances where the change of grade connectors 10 or 10A are to be included in a curved or arcuate landscaping arrangement, the single fastener 13 connection of the two connector members may cause a separation of the planar front surfaces 16 and 16' near the radiused ends on each connector member from the respective adjacent front sides 16' and 16 of the adjacent other connector member. To solve this issue of aesthetics, I have provided a modified change of grade connector 10C in FIGS. 9 and 10 which includes a lance 45 on each connector member 11 and 12. Each lance 45 is punched from the material of each connector member 11, 12 adjacent the squared off end and projects laterally outwardly of each respective front face 16 and 16' so that a length X of each thereof extends parallel to each front face 16 and 16' and is spaced from the front face a distance Y that is slightly greater than the thickness Z of the material of the connector members. Further, the lances 45 are each located and configured to overlap the respective rear surface 17' and 17 of the adjacent connector member as shown in FIGS. 9 and 10. The lances 45 will serve to hold the mutually facing front surfaces 16 and 16' near the rounded ends in close proximity to each other to preserve the aesthetic integrity of the arcuate landscape edging assembly. On the other hand, the use of the pair of fasteners as depicted in FIG. 8 will serve this same purpose to keep the opposing front faces together when the connector members 11 and 12 are bent into an arc.

Although particular preferred embodiments of the present invention have been disclosed in detail for illustrative purposes, it will be recognized that variations or modifications lie within the scope of the present invention and do not depart from the spirit of the invention, as set forth in the foregoing description and drawings, and in the following claims.

What is claimed is:

1. A change of grade connector assembly comprising:
   first and second substantially planar landscaping edging strips;
   first and second substantially planar connector members, said connector members defining parallel first and second planes and each comprising a receiver for operably engaging one of said first and second landscaping edging strips;
   said first connector member having a first longitudinal axis and said second connector member having a second longitudinal axis;
   a fastener assembly defining a pivot axis perpendicular to said first and second planes, said fastener assembly being configured to pivotally attach said first connector member to said second connector member;
   said first landscaping edging strip being engaged by said receiver of said first connector member and fixed relative to said first longitudinal axis and said second landscaping edging strip being engaged by said receiver of said second connector member and fixed relative to said second longitudinal axis; and
   said first and second connector members being pivotal with respect to each other about said pivot axis between a first position in which said first and second longitudinal axes are aligned and a second position in which said first and second longitudinal axes are out of alignment.

2. The change of grade connector assembly according to claim 1, wherein each of said first and second connector members are composed of at least one of aluminum, steel and plastic.

3. The change of grade connector assembly according to claim 1, wherein said fastener assembly is a single nut and bolt assembly and an axis of the bolt corresponds to the pivot axis.

4. The change of grade connector assembly according to claim 1, wherein each of said first and second connector members includes a stop which is configured to limit the distance said landscaping edging strip is engaged by said receiver of said connector member.

5. The change of grade connector assembly according to claim 1, wherein said first longitudinal axis is inclined relative to said second longitudinal axis to angles between 0° and 90° when said first and second connector members are in said second position.

6. The change of grade connector assembly according to claim 1, wherein said first and second connector members are infinitely adjustable between said first and second positions.

7. The change of grade connector assembly according to claim 1, wherein said fastener assembly includes a hole and arcuate slot in each of said first and second connector members and being configured to orient a hole in one connector member with an arcuate slot in the other connector member when two opposing sides of the connector members are mated, a nut and bolt assembly being received in each aligned hole and arcuate slot to thereby orient said pivot axis midway between each hole and arcuate slot.

8. The change of grade connector assembly according to claim 7, wherein one end of each connector member is rounded on a radius having a center point corresponding to said pivot axis.

9. The change of grade connector assembly according to claim 1, wherein one end of each connector member is rounded on a radius having a center point corresponding to said pivot axis.

10. The change of grade connector assembly according to claim 1, wherein there is provided a lance on both of said first and second connector members projecting from a side thereof and configured to overlap a surface opposed thereto on an adjacent connector member.

11. The change of grade connector assembly according to claim 1, wherein said first and second connector members are pivotal with respect to each other about said pivot axis in a vertical plane.

12. A change of grade connector comprising:
    a first connector member having a first longitudinal axis and including an upper longitudinal channel and a lower longitudinal channel configured for receiving an upper edge and a lower edge respectively of a first landscape edging strip;
    a second connector member having a second longitudinal axis and configured to attach to a second landscape edging strip; and
    a fastener assembly defining a pivot axis, said fastener assembly being configured to pivotally attach said first connector member to said second connector member,
    wherein said first and second connector members are configured to pivot with respect to each other about said pivot axis between a first position in which said first and second longitudinal axes are aligned and a second position in which said first and second longitudinal axes are out of alignment.

13. The change of grade connector according to claim 12, wherein the second connector member includes an upper longitudinal channel and a lower longitudinal channel configured for receiving an upper edge and a lower edge respectively of the second landscape edging strip.

14. The change of grade connector according to claim 13, wherein at least one of said first and second connector members includes a stop that is configured to limit the distance the respective landscape edging strip can be moved along said at least one connector member.

15. The change of grade connector according to claim 14, wherein said stop comprises a closed end of one of said channels.

16. The change of grade connector according to claim 12, wherein said first longitudinal axis is inclined relative to said second longitudinal axis to angles between 0° and 90° when said connector is in said second position.

17. The change of grade connector according to claim 12, wherein said first and second connector members are infinitely adjustable between said first and second positions.

18. The change of grade connector according to claim 12, wherein at least one of said first and second connector members includes a stop that is configured to limit the distance the respective landscape edging strip can be moved along said at least one connector member.

19. The change of grade connector assembly according to claim 1, wherein said first landscaping edging strip has a centerline and is engaged by said receiver of said first connector member with said centerline parallel to said first longitudinal axis.

20. The change of grade connector assembly according to claim 19, wherein said second landscaping edging strip has a centerline and is engaged by said receiver of said second connector member with said centerline of said second landscaping edging strip parallel to said second longitudinal axis.

* * * * *